US012756419B2

(12) United States Patent
Yoshida et al.

(10) Patent No.: US 12,756,419 B2
(45) Date of Patent: Oct. 6, 2026

(54) TRANSMITTER/RECEIVER, TRANSMISSION/RECEPTION DEVICE, AND TRANSMISSION/RECEPTION METHOD

(71) Applicant: NEC Corporation, Tokyo (JP)

(72) Inventors: Kohei Yoshida, Tokyo (JP); Koya Takata, Tokyo (JP); Fujio Okumura, Kanagawa (JP); Ryota Nihei, Tokyo (JP); Kenji Wakafuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 18/725,913

(22) PCT Filed: Jan. 20, 2022

(86) PCT No.: PCT/JP2022/001952
§ 371 (c)(1),
(2) Date: Jul. 1, 2024

(87) PCT Pub. No.: WO2023/139717
PCT Pub. Date: Jul. 27, 2023

(65) Prior Publication Data
US 2025/0062786 A1 Feb. 20, 2025

(51) Int. Cl.
*H04B 1/40* (2015.01)

(52) U.S. Cl.
CPC .................................... *H04B 1/40* (2013.01)

(58) Field of Classification Search
CPC ... H04B 1/40; H04B 1/04; H04B 1/18; H04B 1/16
See application file for complete search history.

(56) References Cited

U.S. PATENT DOCUMENTS 12,160,050 B2 * 12/2024 Maeda .................. G01R 29/08

FOREIGN PATENT DOCUMENTS

| | | | |
|---|---|---|---|
| JP | 2013-168844 | A | 8/2013 |
| JP | 6721226 | B1 | 7/2020 |
| JP | 2021-158600 | A | 10/2021 |
| WO | 2013/121686 | A1 | 8/2013 |
| WO | 2019/087514 | A1 | 5/2019 |
| WO | 2020/050223 | A1 | 3/2020 |

OTHER PUBLICATIONS

International Search Report for PCT Application No. PCT/JP2022/001952, mailed on Apr. 5, 2022.
English translation of Written opinion for PCT Application No. PCT/JP2022/001952, mailed on Apr. 5, 2022.

* cited by examiner

*Primary Examiner* — Tuan H Nguyen
(74) *Attorney, Agent, or Firm* — Sughrue Mion, PLLC

(57) ABSTRACT

A transmitter/receiver that includes a spherical radio wave lens in which a meta-surface converging a desired radio wave which is a transmitting/receiving target is formed and a plurality of array antennas that are arranged to face the spherical radio wave lens, and include antenna units that transmit and receive the desired radio wave which is the transmitting/receiving target and are arranged in accordance with focal positions of the spherical radio wave lens.

10 Claims, 13 Drawing Sheets

TRANSMITTER/RECEIVER, TRANSMISSION/RECEPTION DEVICE, AND TRANSMISSION/RECEPTION METHOD

This application is a National Stage Entry of PCT/JP2022/001952 filed on Jan. 20, 2022, the contents of all of which are incorporated herein by reference, in their entirety.

TECHNICAL FIELD

The present disclosure relates to a transmitter/receiver or the like used for transmission and reception of radio waves.

BACKGROUND ART

In mobile communication beyond the 5th generation mobile communication (also referred to as 5G), radio waves of a high frequency band are used as compared with generations before 5G. The radio waves of the high frequency band have high straightness and are easily attenuated as compared with generations before 5G. Therefore, in the mobile communication of 5G or later, the radio waves transmitted from the base station are less likely to reach the receiver than in the generations before 5G. For this reason, there is a demand for a technique for efficiently enabling the radio waves of the high frequency band used in the mobile communication of 5G or later to reach the antenna of the receiver.

PTL 1 discloses a phased array antenna device having an array antenna including a plurality of antenna elements. A plurality of antenna elements included in the device disclosed in PTL 1 are arranged in a two-dimensional array form.

PTL 2 discloses a terminal that enables desired radio waves to reach an antenna by using a meta-surface substrate. The terminal disclosed in PTL 2 includes a transmission direction limiting unit and a control unit. The transmission direction limiting unit includes a plurality of meta-surface units. Each of a plurality of meta-surface units includes a meta-surface substrate and a dielectric substrate arranged opposite to the meta-surface substrate. The control unit adjusts the distance between the meta-surface substrate and the dielectric substrate of a plurality of meta-surface units to decide a direction in which the radio wave is transmitted based on an arrival direction of a desired radio wave or an arrival direction of an interference wave. For example, by arranging the transmission direction limiting unit of PTL 2 on a window glass, it is possible to efficiently enable the radio waves of the high frequency band, which are used in the mobile communication of 5G or later, to reach the antenna arranged inside the terminal.

CITATION LIST

Patent Literature

PTL 1: JP 6721226 B
PTL 2: JP 2021-158600 A

SUMMARY OF INVENTION

Technical Problem

In the device disclosed in PTL 1, it is possible to increase the number of communication targets that can be simultaneously communicated by reducing the number of antenna elements constituting the array antenna and increasing the number of array antennas. However, when the number of antenna elements constituting the array antenna is excessively reduced, an area of each array antenna allocated to beamforming is reduced, and a gain is reduced. In the device disclosed in PTL 1, it is possible to increase the gain of each array antenna by increasing the number of antenna elements constituting the array antenna and reducing the number of array antennas. However, when the number of antenna elements constituting the array antenna is excessively increased, the number of communicable channels decreases. That is, in the device disclosed in PTL 1, there is a trade-off relationship between the gain of the array antenna and the number of communications.

In the technique disclosed in PTL 2, the distance between the meta-surface substrate and the dielectric substrate is dynamically controlled in accordance with a reception situation of a desired radio wave such that the desired radio wave reaches the antenna arranged at a predetermined position. That is, in the technique disclosed in PTL 2, it is hard to enable a desired radio wave to reach the antenna unless the desired radio wave is received by the antenna. Unless anticipated in advance, it is difficult to accurately predict the arrival direction of the desired radio wave. Therefore, in the technique disclosed in PTL 2, it is difficult to simultaneously receive the desired radio waves arriving from the multiple directions.

It is an object of the present disclosure is to provide a transmitter/receiver or the like which is capable of simultaneously transmitting and receiving a desired radio wave to and from a plurality of communication targets while achieving both the gain and the number of communications.

Solution to Problem

A transmitter/receiver according to one aspect of the present disclosure includes a spherical radio wave lens in which a meta-surface converging a desired radio wave which is a transmitting/receiving target is formed and a plurality of array antennas that are arranged to face the spherical radio wave lens, and include antenna units that transmit and receive the desired radio wave which is the transmitting/receiving target and are arranged in accordance with focal positions of the spherical radio wave lens.

A transmission/reception method according to one aspect of the present disclosure uses a transmitter/receiver including a spherical radio wave lens in which a meta-surface converging a desired radio wave which is a transmitting/receiving target is formed and an array antenna that is arranged to face the spherical radio wave lens, and includes antenna units that transmit and receive the desired radio wave which is the transmitting/receiving target and are arranged in accordance with focal positions of the spherical radio wave lens to acquire a reception signal associated with a radio wave received by the transmitter/receiver, decode and output the acquired reception signal, acquire a transmission signal directed toward a communication target, and output the acquired transmission signal to an antenna unit that transmits the acquired transmission signal toward the communication target.

Advantageous Effects of Invention

According to the present disclosure, it is possible to provide a transmitter/receiver or the like which is capable of simultaneously transmitting and receiving a desired radio wave to and from a plurality of communication targets while achieving both the gain and the number of communications.

EXAMPLE EMBODIMENTS

Figure 1:
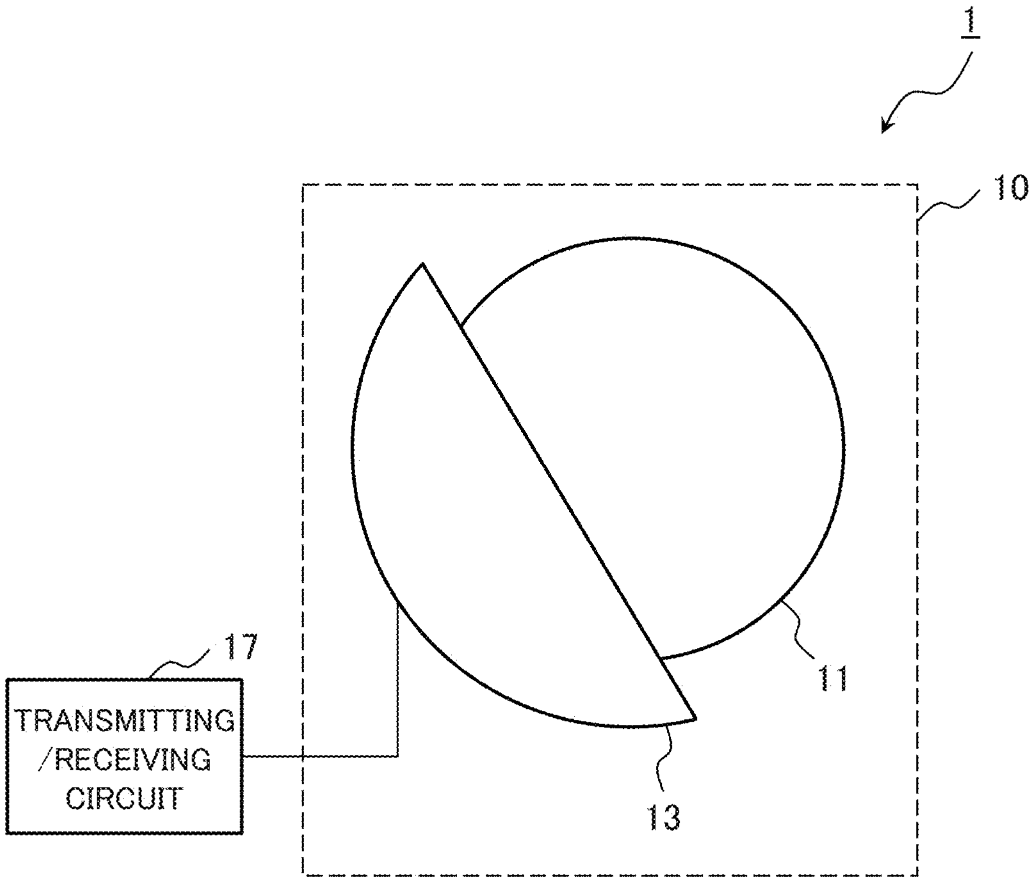
FIG. 1 is a conceptual diagram illustrating an example of a configuration of a transmission/reception device according to a first example embodiment.

Hereinafter, example embodiments of the present invention will be described with reference to the drawings. However, the example embodiments described below have technically preferable limitations for carrying out the present invention, but the scope of the invention is not limited to the following example embodiments. In all the drawings used in the description of the following example embodiments, the same parts are denoted by the same reference numerals unless there is a particular reason. In the following example embodiments, repeated description of similar configurations or operations may be omitted.

First Example Embodiment

First, a transmission/reception device according to a first example embodiment will be described with reference to the drawings. The transmission/reception device of the present example embodiment includes a spherical radio wave lens having a meta-surface. The meta-surface is an artificial medium in which structures smaller than a wavelength of a desired radio wave serving as a reception target are periodically arranged on a surface of an object. By using the meta-surface, a certain dielectric constant/magnetic permeability can be obtained by a plurality of structures arranged periodically.

Configuration

FIG. 1 is a block diagram illustrating an example of a configuration of a transmission/reception device 1 according to the present example embodiment. The transmission/reception device 1 includes a spherical radio wave lens 11, an array antenna 13, and a transmitting/receiving circuit 17. The spherical radio wave lens 11 and the array antenna 13 constitute a transmitter/receiver 10.

Figure 2:
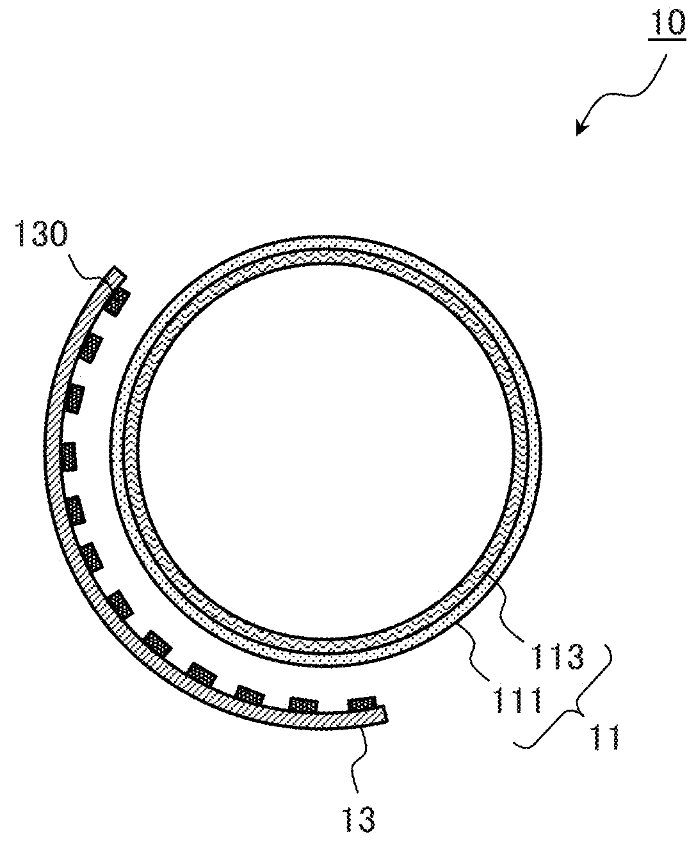
FIG. 2 is a cross-sectional view for describing a configuration example of a transmitter/receiver according to the first example embodiment.

FIG. 2 is a cross-sectional view of the transmitter/receiver 10 of FIG. 1 which is taken along a plane parallel to a paper plane of FIG. 1. The spherical radio wave lens 11 includes a meta-surface portion 111 and a support 113. A plurality of antenna units 130 are arranged in a concave surface portion of the array antenna 13. FIG. 2 illustrates an example in which the meta-surface portion 111 is formed outside the support 113. The meta-surface portion 111 may be formed inside the support 113.

The spherical radio wave lens 11 is arranged to face the array antenna 13. At least a part of the surface of the spherical radio wave lens 11 is arranged to face a transmitting/receiving surface of the array antenna 13. The spherical radio wave lens 11 converges the radio wave arriving from a certain direction toward the single antenna unit 130. The spherical radio wave lens 11 converges the radio wave transmitted from any one of the antenna units 130 toward the transmission direction of the radio wave. The radio wave emitted from the spherical radio wave lens 11 is transmitted as a directional radio wave.

The spherical radio wave lens 11 includes the meta-surface portion 111 and the support 113. The spherical radio wave lens 11 has a structure in which the meta-surface portion 111 is supported by the spherical support 113. The inside of the support 113 is hollow. The meta-surface portion 111 converges the desired radio wave toward the single antenna unit 130 according to the arrival direction of the desired radio wave. The meta-surface portion 111 converges the radio wave transmitted from any one of the antenna units 130 toward the transmission direction of the radio wave.

The meta-surface portion 111 and the support 113 are made of a material having high transmittance for a desired radio wave. For example, the meta-surface portion 111 and the support 113 are made of glass or polymer. The meta-surface portion 111 and the support 113 may be made of the same material or may be made of different materials.

A plurality of unit cells (not illustrated) are formed in the meta-surface portion 111. A plurality of unit cells are associated with at least one of the plurality of antenna units 130. For example, a plurality of unit cells are patterns formed of a metal film. The unit cell may be formed by a transparent electrode. A plurality of unit cells may have different sizes or the same size depending on the position in the meta-surface portion 111. For example, the size of the unit cell is set to 1/10 or more and 1/5 or less of a wavelength of a desired radio wave. A plurality of unit cells may have the same shape or different shapes depending on the position in the meta-surface portion 111. For example, when a plurality of unit cells have a plurality of shapes, a desired radio wave can be guided to at least one of a plurality of antenna units 130 arranged in the array antenna 13. Each of a plurality of unit cells is associated with at least one of a plurality of antenna units 130 arranged in the array antenna 13. In the present example embodiment, each of a plurality of unit cells is associated with any one of a plurality of antenna units 130 arranged in the array antenna 13.

For example, a plurality of unit cells are formed on a surface of the meta-surface portion 111 on a side facing the array antenna 13. For example, a plurality of unit cells are formed on a surface of the meta-surface portion 111 on a side not facing the array antenna 13. In these cases, the desired radio wave passes through the surface on which the unit cell is formed once before being received by the antenna unit 130. For example, a plurality of unit cells are formed on the entire surface of the meta-surface portion 111. In a case in which a plurality of unit cells are formed on the entire surface of the meta-surface portion 111, the desired radio wave passes through the surface on which the unit cell is formed twice before being received by the antenna unit 130. The refractive index of the desired radio wave by the spherical radio wave lens 11 is set according to the number of passes through the surface on which the unit cell is formed, the dielectric constant of the meta-surface portion 111 and the support 113, and the convergence property of the desired radio wave by the unit cell.

The array antenna 13 is arranged to face the spherical radio wave lens 11. The array antenna 13 has a three-dimensional (spherical cap) shape obtained by cutting a hollow sphere with a plane. The inner surface (concave surface) of the array antenna 13 is a transmitting/receiving surface. A plurality of antenna units 130 are arranged on the transmitting/receiving surface of the array antenna 13. For example, a plurality of antenna units 130 are arranged at focal positions of the spherical radio wave lens 11. As long as the desired radio wave converged by the spherical radio wave lens 11 can be efficiently received, a plurality of antenna units 130 may be arranged at positions deviated from the focal positions of the spherical radio wave lens 11.

The arrangement of a plurality of antenna units 130 is not limited. For example, a plurality of antenna units 130 are arranged at regular intervals on the transmitting/receiving surface of the array antenna 13. For example, a plurality of antenna units 130 are arranged in an array (mesh) form on the transmitting/receiving surface of the array antenna 13. A plurality of antenna units 130 may be arranged one-dimensionally (in an arc form) or two-dimensionally (in a mesh form) along the transmitting/receiving surface of the array antenna 13. A plurality of antenna units 130 are antennas for transmitting and receiving desired radio waves. For example, the size or shape of the antenna unit 130 is set according to the wavelength of the desired radio wave which is a transmitting/receiving target.

The antenna unit 130 is used to transmit and receive desired radio waves. The radio wave converged by the spherical radio wave lens 11 is incident on the antenna unit 130. The radio wave converged by the associated unit cell is incident on the antenna unit 130. The antenna unit 130 receives the desired radio wave, which is a reception target, among the incident radio waves. The antenna unit 130 converts the received desired radio wave into an electric current (also referred to as a reception signal). The reception signal includes information from the communication target. The antenna unit 130 outputs the reception signal to the transmitting/receiving circuit 17.

A transmission signal is input from the transmitting/receiving circuit 17 to the antenna unit 130. The antenna unit 130 converts the input transmission signal into a radio wave. The transmission signal includes information directed toward the communication target. The antenna unit 130 transmits the converted radio wave.

The transmitting/receiving circuit 17 is connected to a plurality of antenna units 130 arranged in the array antenna 13. The transmitting/receiving circuit 17 acquires the reception signals associated with the desired radio waves received by a plurality of antenna units 130. The transmitting/receiving circuit 17 converts the reception signal into a digital signal. The transmitting/receiving circuit 17 decodes the converted digital signal. The transmitting/receiving circuit 17 outputs the decoded signal. An output destination and purpose of the signal output from the transmitting/receiving circuit 17 are not particularly limited.

Figure 3:
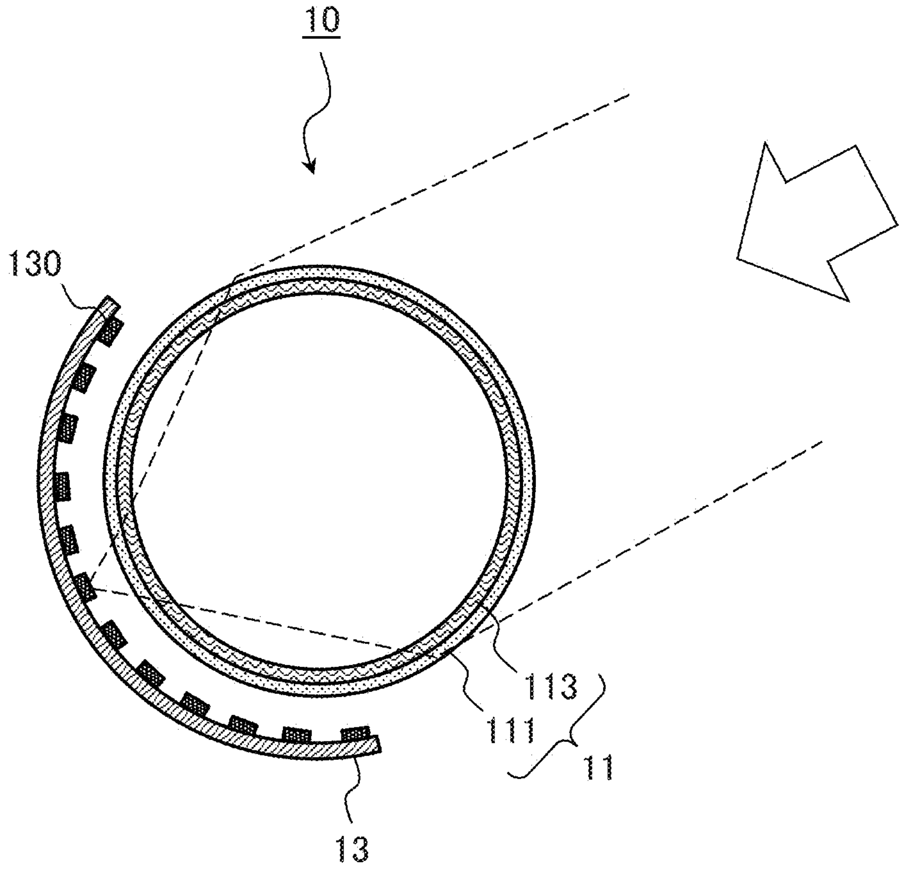
FIG. 3 is a conceptual diagram for describing an example of reception of a radio wave by the transmitter/receiver according to the first example embodiment.

FIG. 3 is a conceptual diagram for describing an example of reception of the desired radio wave by the transmitter/receiver 10. The desired radio wave is incident on the spherical radio wave lens 11. The spherical radio wave lens 11 converges the desired radio wave toward any one of a plurality of antenna units 130 according to the arrival direction of the desired radio wave. The desired radio wave converged by the spherical radio wave lens 11 is received by any one of the antenna units 130. The transmitter/receiver 10 receives the desired radio wave by the antenna unit 130 associated with the arrival direction of the desired radio wave. In the present example embodiment, the desired radio waves arriving from the wide range are converged onto one of the antenna units 130 via the spherical radio wave lens 11. Therefore, according to the present example embodiment, the reception strength of the desired radio wave can be substantially amplified.

The transmitting/receiving circuit 17 outputs the transmission signals transmitted from a plurality of antenna units 130 to any one of the antenna units 130. An output destination and purpose of the transmission signal output from the transmitting/receiving circuit 17 to the antenna unit 130 are not particularly limited.

Figure 4:
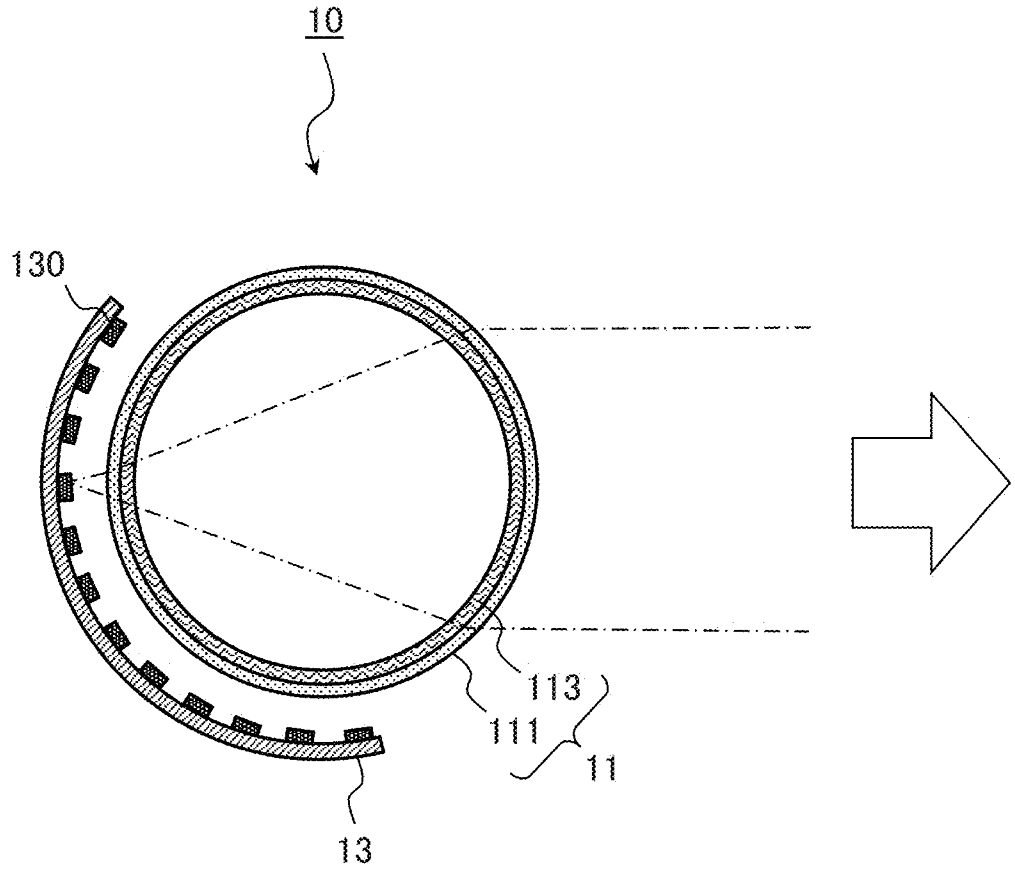
FIG. 4 is a conceptual diagram for describing an example of transmission of a radio wave by the transmitter/receiver according to the first example embodiment.

FIG. 4 is a conceptual diagram for describing an example of transmission of the desired radio wave by the transmitter/receiver 10. The transmission signal to be transmitted toward the communication target is input from the transmitting/receiving circuit 17 to each of a plurality of antenna units 130. Each of a plurality of antenna units 130 converts the input transmission signal into the radio wave. Each of a plurality of antenna units 130 radiates the converted radio wave. The radio wave radiated from each of a plurality of antenna units 130 is transmitted through the spherical radio wave lens 11. The radio wave transmitted through the spherical radio wave lens 11 is radiated to the free space. The transmitter/receiver 10 transmits the radio wave from the antenna unit 130 associated with the transmission direction of the desired radio wave. According to the present example embodiment, it is possible to transmit the radio wave radiated from any one of the antenna units 130 as the radio wave with high directivity via the spherical radio wave lens 11.

For example, the transmitting/receiving circuit 17 transmits and receives the desired radio waves by using the different antenna units 130. By using the different antenna units 130, transmission and reception of the desired radio waves can be performed simultaneously. For example, the transmitting/receiving circuit 17 transmits and receives the desired radio waves by using the same antenna unit 130. By using the same antenna unit 130, transmission and reception of the desired radio waves may be performed in a time division manner, and transmission and reception of the desired radio waves may be performed at different timings.

As described above, the transmission/reception device of the present example embodiment includes the transmitter/ receiver and the transmitting/receiving circuit. The transmitter/receiver includes the spherical radio wave lens and the array antenna. The meta-surface that converges the desired radio wave which is a transmitting/receiving target is formed in the spherical radio wave lens. The spherical radio wave lens converges the desired radio waves arriving from the same direction toward the single antenna unit. The array antenna is arranged to face the spherical radio wave lens. In the array antenna, a plurality of antenna units that transmit and receive the desired radio wave which is a transmitting/receiving target are arranged in accordance with the focal positions of the spherical radio wave lens. The transmitting/receiving circuit acquires the reception signal associated with the radio wave received by the transmitter/receiver. The transmitting/receiving circuit decodes and outputs the acquired reception signal. The transmitting/receiving circuit acquires the transmission signal directed toward the communication target. The transmitting/receiving circuit outputs the acquired transmission signal to the antenna unit that transmits the acquired transmission signal toward the communication target.

The transmission/reception device of the present example embodiment receives the desired radio wave converged by the spherical radio wave lens by a plurality of antenna units arranged in accordance with the focal positions of the spherical radio wave lens. The transmission/reception device according to the present example embodiment can perform simultaneous transmission and reception of the desired radio waves with a plurality of communication targets by using a plurality of antenna units. The transmission/reception device of the present example embodiment receives the desired radio wave by a plurality of antenna units arranged in accordance with the focal positions of the spherical radio wave lens. Therefore, since the transmission/reception device of the present example embodiment has a larger reception area than the radio wave lens arranged on a plurality of antenna unit planes, the high gain can be obtained. That is, according to the transmission/reception device of the present example embodiment, it is possible to perform simultaneous transmission and reception of the desired radio wave with a plurality of communication targets while achieving both the gain and the number of communications.

In the transmission/reception device of the present example embodiment, since the light receiving surface of the antenna unit is spherical, the reception area and the reception strength of the desired radio wave can be increased as compared with the planar antenna. Since the transmission/reception device of the present example embodiment has a wide reception range for the desired radio wave, it is possible to simultaneously communicate with a plurality of communication targets scattered in a wide range as a single device. Since the transmission/reception device of the present example embodiment transmits the transmission radio wave with high directivity in the direction of the antenna unit, it is not necessary to control the direction of the transmission radio wave. In the present example embodiment, a plurality of antenna units are not phased arrayed. Therefore, the phase shifter is unnecessary in the transmission/reception device of the present example embodiment, and the cost can be suppressed.

In the typical phased array antenna, the phased arrays are assembled on the planar light receiving surface divided into a plurality of antenna units including 2×2 units (4 divisions) or 4×4 units (16 divisions). In the typical phased array antenna, each antenna unit communicates with a single communication target. For example, in a case in which the planar light receiving surface is divided into 16×16 and the antenna unit is 2×2 (divided into 4), 64 channels are allocated to the phased array antenna. For example, in a case in which the planar light receiving surface is divided into 16×16 (divided into 256) and the antenna unit is 4×4 (16), 16 channels are allocated to the phased array antenna. On the other hand, in the array antenna of the transmission/reception device of the present example embodiment, one channel is allocated to each of the 256 antenna units arranged in a spherical shape without assembling the phased arrays, so 256 channels are allocated. The transmission/reception device of the present example embodiment can simultaneously perform transmission and reception by using the 256 channels. That is, according to the technique of the present example embodiment, the number of channels can be increased as compared with the case of using the typical planar phased array antenna. Since the phase shifter is unnecessary in the transmission/reception device of the present example embodiment, the circuit can be simplified and the cost can be reduced as compared with the typical phased array antenna.

In one aspect of the present example embodiment, the spherical radio wave lens includes the support and the meta-surface portion. The support has a spherical shape and transmits a desired radio wave. The meta-surface includes a meta-surface in which structures smaller than the wavelength of the desired radio wave are periodically arranged on the surface. According to the present aspect, it is possible to implement the spherical radio wave lens in which the meta-surface is supported by the support.

In one aspect of the present example embodiment, the array antenna has a spherical cap shape. A plurality of antenna units are arranged on the concave surface of the array antenna. The concave surface of the array antenna is arranged toward the spherical radio wave lens. In the transmission/reception device of the present aspect, a plurality of antenna units are arranged on the concave surface of the array antenna having a spherical shell shape. Therefore, according to the present aspect, since the reception range of the desired radio wave is wider, and the communication range can be expanded, as compared with the case in which a plurality of antenna units are arranged in a planar form.

In one aspect of the present example embodiment, a plurality of antenna units are arranged in an arc form on the concave surface of the array antenna. For example, a plurality of antenna units are arranged along the arrival direction of the desired radio wave. According to the present aspect, it is possible to efficiently receive the desired radio waves arriving in the arrangement directions of a plurality of antenna units.

In one aspect of the present example embodiment, a plurality of antenna units are arranged in a mesh form on the concave surface of the array antenna. For example, a plurality of antenna units are arranged in any direction. According to the present aspect, the desired radio wave arriving in a certain direction can be received without loss.

In one aspect of the present example embodiment, the transmitting/receiving circuit performs transmission and reception of the desired radio waves with the same communication target in a time division manner by using the same antenna unit. According to the present aspect, the antenna unit can be shared with the same communication target in transmission and reception of the desired radio wave.

In the present example embodiment, the example in which the radio wave lens has a spherical shape has been described. The radio wave lens may not have a spherical shape as long as it has at least one curved surface. For example, the radio wave lens may have a spheroidal shape. For example, the radio wave lens may have a certain rotation surface. The curved surface of the radio wave lens may be set according to its purpose.

Second Example Embodiment

Next, a transmission/reception device according to a second example embodiment will be described with reference to the drawings. The transmission/reception device of the present example embodiment is different from that of the first example embodiment in that the desired radio waves arriving from the same direction are received by a plurality of antenna units. That is, in the present example embodiment, a plurality of antenna units are phased-arrayed. Hereinafter, an example in which two antenna units receive the desired radio waves arriving from the same direction will be described, but three or more antenna units may be configured to receive the desired radio waves arriving from the same direction.

Configuration

Figure 5:
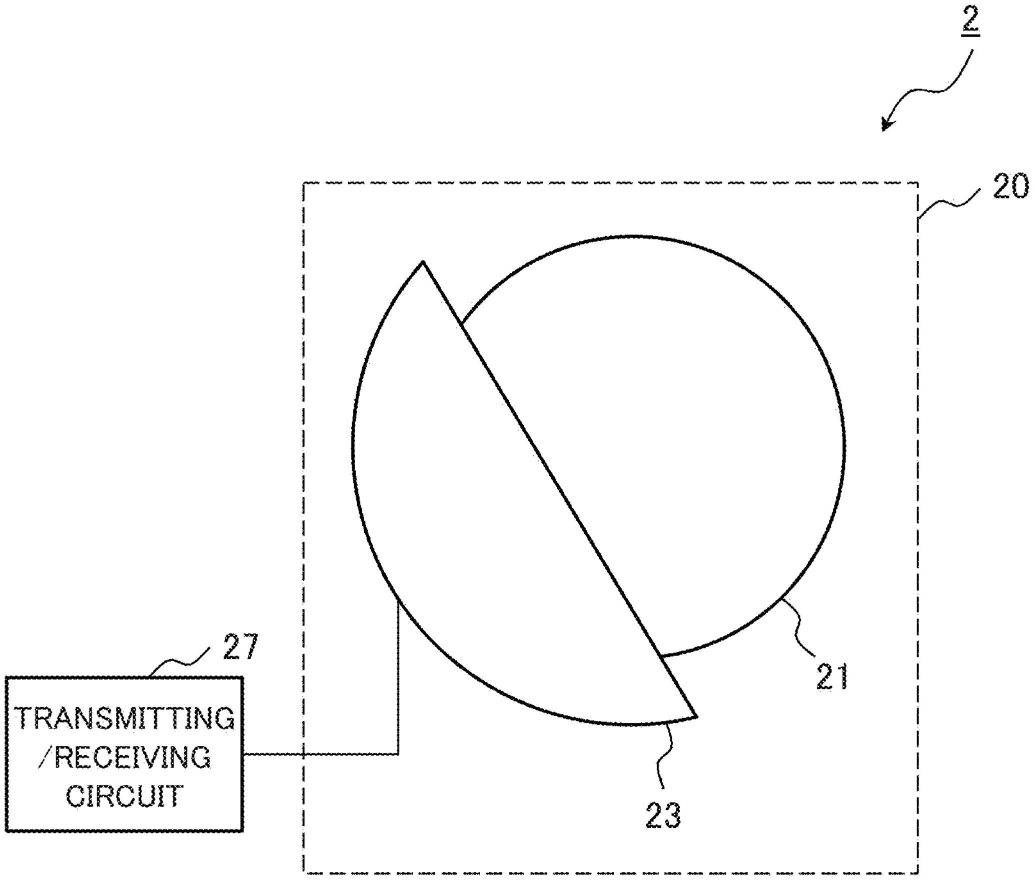
FIG. 5 is a conceptual diagram illustrating an example of a configuration of a transmission/reception device according to a second example embodiment.

FIG. 5 is a block diagram illustrating an example of a configuration of a transmission/reception device 2 according to the present example embodiment. The transmission/reception device 2 includes a spherical radio wave lens 21, an array antenna 23, and a transmitting/receiving circuit 27. The spherical radio wave lens 21 and the array antenna 23 constitute a transmitter/receiver 20.

Figure 6:
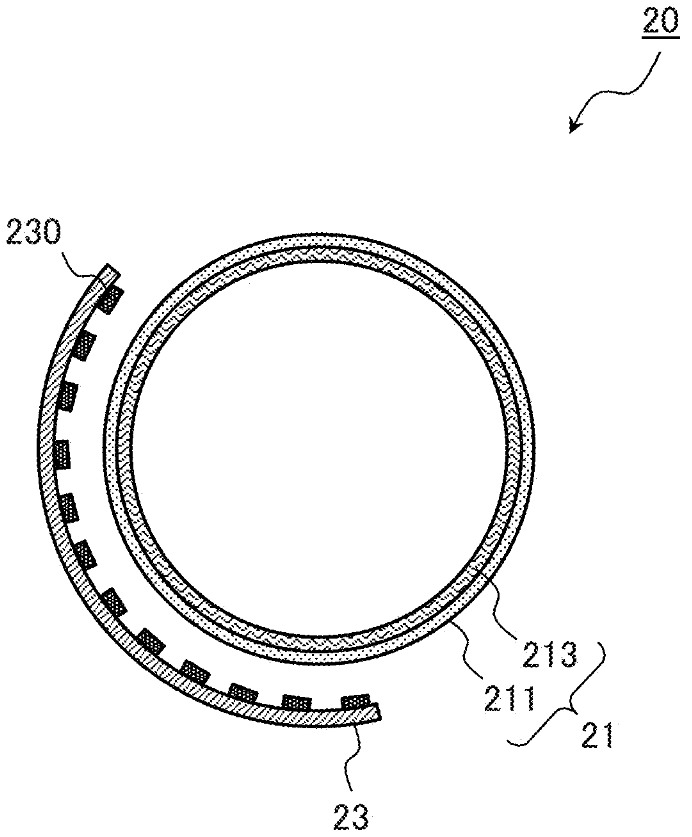
FIG. 6 is a cross-sectional view for describing a configuration example of a transmitter/receiver according to the second example embodiment.

FIG. 6 is a cross-sectional view of the transmitter/receiver 20 of FIG. 5 taken along a plane parallel to the paper plane of FIG. 5. The spherical radio wave lens 21 includes a meta-surface portion 211 and a support 213. A plurality of antenna units 230 are arranged in a concave surface portion of the array antenna 23. In the following description, parts similar to those in the first example embodiment will not be described.

The spherical radio wave lens 21 has the same configuration as the spherical radio wave lens 11 of the first example embodiment. The spherical radio wave lens 21 is arranged to face the array antenna 23. At least a part of the surface of the spherical radio wave lens 21 is arranged to face the transmitting/receiving surface of the array antenna 23. The spherical radio wave lens 21 converges the radio wave arriving from a certain direction toward at least two antenna units 230. The spherical radio wave lens 21 converges the radio wave transmitted from any one of the antenna units 230 toward the transmission direction of the radio wave. The radio wave emitted from the spherical radio wave lens 21 is transmitted as a directional radio wave.

The spherical radio wave lens 21 includes a meta-surface portion 211 and a support 213. The spherical radio wave lens 21 has a structure in which the meta-surface portion 211 is supported by the spherical support 213. The inside of the support 213 is hollow. The meta-surface portion 211 converges the desired radio wave toward at least two antenna units 230 according to the arrival direction of the desired radio wave. In a case in which the refractive indices of the desired radio waves by the meta-surface portion 211 are the same, it is desirable to reduce the distance between the spherical radio wave lens 21 and the array antenna 23. For example, the desired radio wave may be converged onto a plurality of antenna units 230 after the refractive index of the desired radio wave by the meta-surface portion 211 is reduced without changing the distance between the spherical radio wave lens 21 and the array antenna 23. The meta-surface portion 211 converges the radio wave transmitted from any one of the antenna units 230 toward the transmission direction of the radio wave.

The array antenna 23 has a configuration similar to the array antenna 13 of the first example embodiment. The array antenna 23 is arranged to face the spherical radio wave lens 21. The array antenna 23 has a three-dimensional (spherical cap) shape obtained by cutting a hollow sphere with a plane. The inner surface (concave surface) of the array antenna 23 is a transmitting/receiving surface. A plurality of antenna units 230 are arranged on the transmitting/receiving surface of the array antenna 23. For example, a plurality of antenna units 230 are arranged at focal positions of the spherical radio wave lens 21. As long as the desired radio wave converged by the spherical radio wave lens 21 can be efficiently received, a plurality of antenna units 230 may be arranged at positions deviated from the focal positions of the spherical radio wave lens 21.

The antenna unit 230 has a configuration similar to that of the antenna unit 130 of the first example embodiment. In order to cause a plurality of antenna units 230 to receive the radio wave converged by the spherical radio wave lens 21, the antenna unit 230 is arranged closer to the spherical radio wave lens 21 than in the first example embodiment. In a case in which the spherical radio wave lens 21 and the antenna unit 230 are brought close to each other, a plurality of antenna units 230 are positioned at the focal positions of the spherical radio wave lens 21. For example, the number of antenna units 230 may be increased to maintain the number of channels. The antenna unit 230 is used to transmit and receive desired radio waves. The radio wave converged by the spherical radio wave lens 21 is incident on the antenna unit 230. The radio wave converged by the associated unit cell is incident on the antenna unit 230. The antenna unit 230 receives the desired radio wave, which is a reception target, among the incident radio waves. The antenna unit 230 converts the received desired radio wave into an electric current (also referred to as a reception signal). The antenna unit 230 outputs the reception signal to the transmitting/receiving circuit 27.

A transmission signal is input from the transmitting/receiving circuit 27 to the antenna unit 230. The antenna unit 230 converts the input transmission signal into a radio wave. The antenna unit 230 transmits the converted radio wave.

The transmitting/receiving circuit 27 is connected to a plurality of antenna units 230 arranged in the array antenna 23. The transmitting/receiving circuit 27 acquires the reception signals associated with the desired radio waves received by a plurality of antenna units 230. In the present example embodiment, since the plurality of antenna units 230 are phased arrayed, the transmitting/receiving circuit 27 includes a phase shifter (not illustrated). The transmitting/receiving circuit 27 changes the phase of the reception signal of each of a plurality of phased arrayed antenna units 230 through the phase shifter and aligns the phases of the reception signals of a plurality of antenna units 230. The transmitting/receiving circuit 27 converts the phase-aligned reception signals into digital signals. The transmitting/receiving circuit 27 decodes the converted digital signals. The transmitting/receiving circuit 27 outputs the decoded signals. An output destination and purpose of the signal output from the transmitting/receiving circuit 27 are not particularly limited.

Figure 7:
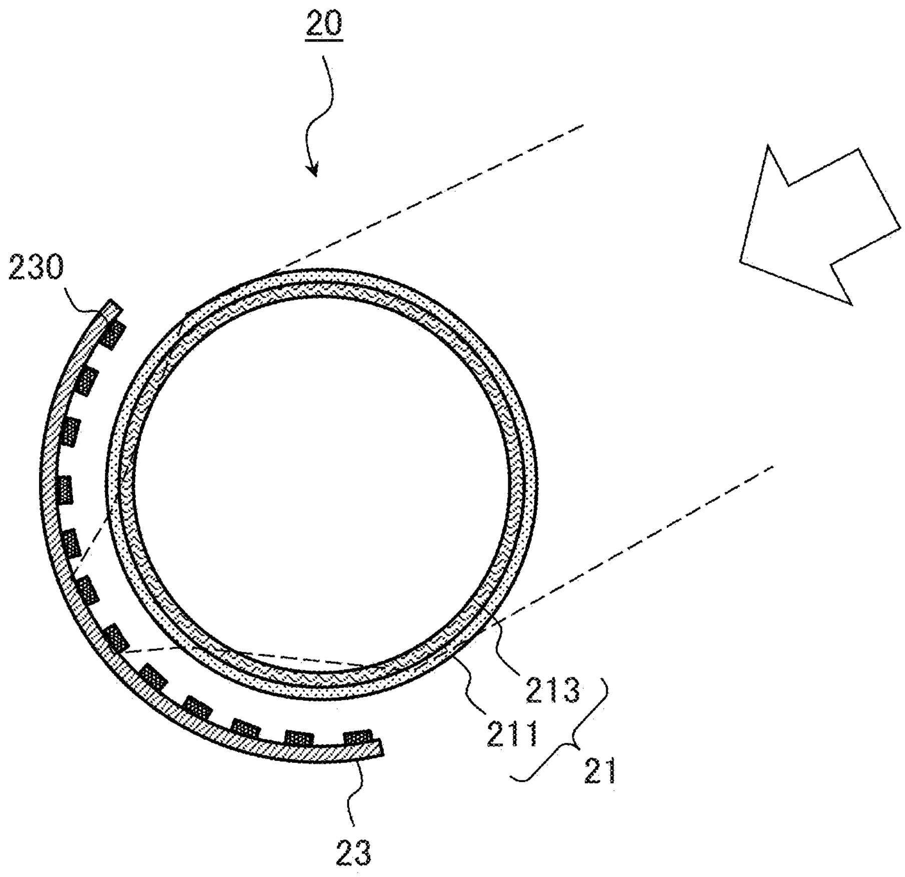
FIG. 7 is a conceptual diagram for describing an example of reception of a radio wave by the transmitter/receiver according to the second example embodiment.

FIG. 7 is a conceptual diagram for describing an example of reception of the desired radio wave by the transmitter/receiver 20. The desired radio wave is incident on the spherical radio wave lens 21. The spherical radio wave lens 21 converges the desired radio wave toward at least two of a plurality of antenna units 230 according to the arrival direction of the desired radio wave. For example, in a case in which the radio wave to be transmitted is one-dimensionally waved, the two antenna units 230 may be used. For example, in a case in which the radio wave to be transmitted is three-dimensionally waved, at least three antenna units 230 are used, and four antenna units 230 are typically used. The desired radio wave converged by the spherical radio wave lens 21 is received by at least two of the antenna units 230. The transmitter/receiver 20 receives the desired radio wave by the antenna unit 230 associated with the arrival direction of the desired radio wave. According to the present example embodiment, the desired radio waves arriving from the wide range can be received by a plurality of antenna units 230 via the spherical radio wave lens 21. Therefore, according to the present example embodiment, a plurality of processes can be simultaneously executed on the radio waves transmitted from the same communication target.

The transmitting/receiving circuit 27 changes the phases of the transmission signals transmitted from a plurality of antenna units 230 by the phase shifter to be converted into the phase of each antenna unit 230. The transmitting/receiving circuit 27 outputs a plurality of transmission signals converted into the phases of each of the antenna units 230 to the antenna units 230 associated with the transmission signals. An output destination and purpose of the transmission signal output from the transmitting/receiving circuit 27 to the antenna unit 230 are not particularly limited.

Figure 8:
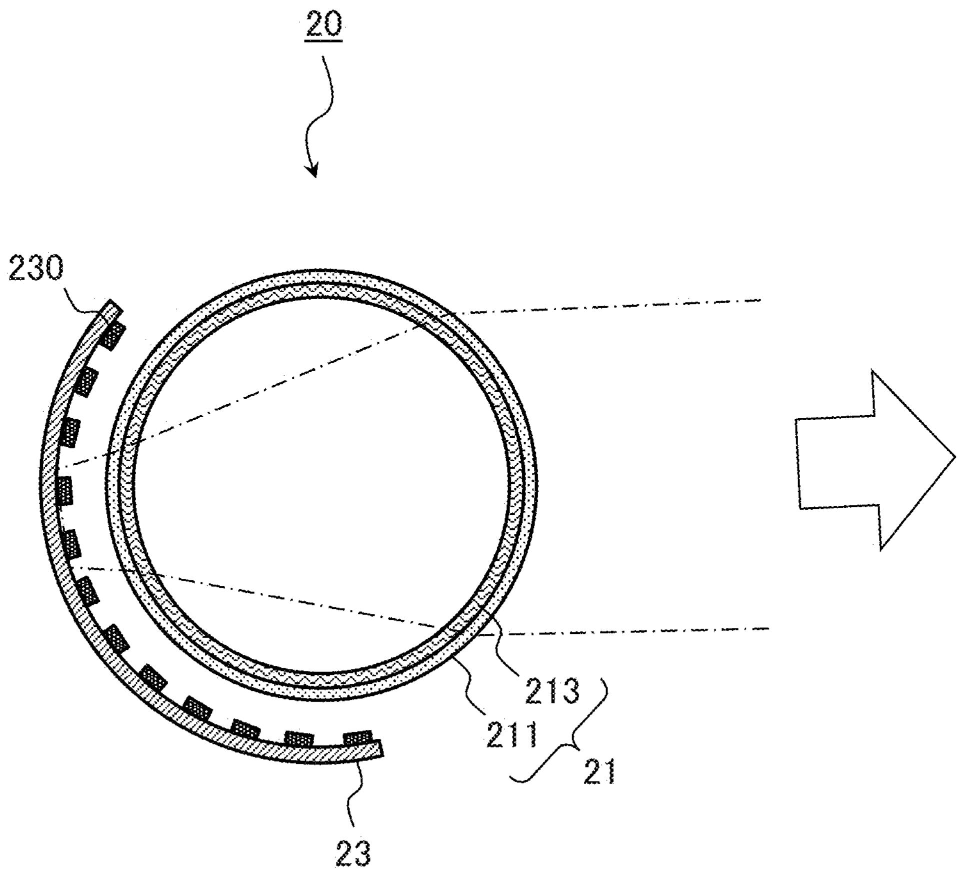
FIG. 8 is a conceptual diagram for describing an example of transmission of a radio wave by the transmitter/receiver according to the second example embodiment.

FIG. 8 is a conceptual diagram for describing an example of transmission of the desired radio wave by the transmitter/receiver 20. The transmission signal to be transmitted toward the communication target is input from the transmitting/receiving circuit 27 to each of a plurality of antenna units 230. Each of a plurality of antenna units 230 converts the input transmission signal into the radio wave. Each of a plurality of antenna units 230 radiates the converted radio wave. In the present example embodiment, the same radio wave is radiated from the at least two antenna units 230. The radio wave radiated from each of a plurality of antenna units 230 is transmitted through the spherical radio wave lens 21. The radio wave transmitted through the spherical radio wave lens 21 is radiated to the free space. The transmitter/receiver 20 transmits the radio wave from the at least two antenna units 230 associated with the transmission direction of the desired radio wave.

In the present example embodiment, the directional radio waves are transmitted from the at least two antenna units 230 in the same direction. According to the present example embodiment, as a plurality of antenna units 230 are phased-arrayed, the transmission direction of the radio wave can be finely adjusted as compared with the case of using only one antenna unit 230. Therefore, according to the present example embodiment, the transmission direction of the transmission radio wave can be finely adjusted as compared with the first example embodiment.

As described above, the transmission/reception device of the present example embodiment includes the transmitter/receiver and the transmitting/receiving circuit. The transmitter/receiver includes the spherical radio wave lens and the array antenna. The meta-surface that converges the desired radio wave which is a transmitting/receiving target is formed in the spherical radio wave lens. The spherical radio wave lens converges the desired radio waves arriving from the same direction toward the at least two antenna units. The array antenna is arranged to face the spherical radio wave lens. In the array antenna, a plurality of antenna units that transmit and receive the desired radio wave which is a transmitting/receiving target are arranged in accordance with the focal positions of the spherical radio wave lens. The transmitting/receiving circuit acquires the reception signal associated with the radio wave received by the transmitter/receiver. The transmitting/receiving circuit decodes and outputs the acquired reception signal. The transmitting/receiving circuit acquires the transmission signal directed toward the communication target. The transmitting/receiving circuit outputs the acquired transmission signal to the antenna unit that transmits the acquired transmission signal toward the communication target.

The transmission/reception device of the present example embodiment receives the desired radio wave converged by the spherical radio wave lens by a plurality of antenna units arranged in accordance with the focal positions of the spherical radio wave lens. The transmission/reception device according to the present example embodiment can perform simultaneous transmission and reception of the desired radio waves with a plurality of communication targets by using a plurality of antenna units. The transmission/reception device of the present example embodiment receives the desired radio wave by a plurality of antenna units arranged in accordance with the focal positions of the spherical radio wave lens. Therefore, since the transmission/reception device of the present example embodiment has a larger reception area than the radio wave lens arranged on a plurality of antenna unit planes, the high gain can be obtained. That is, according to the transmission/reception device of the present example embodiment, it is possible to perform simultaneous transmission and reception of the desired radio wave with a plurality of communication targets while achieving both the gain and the number of communications. The transmission/reception device according to the present example embodiment performs transmission and reception of the desired radio waves arriving from the same direction through at least antenna units. Therefore, according to the transmission/reception device of the present example embodiment, the transmission direction of the transmission radio wave can be finely adjusted by causing a plurality of antenna units to be phased-arrayed.

Third Example Embodiment

Next, a transmitter/receiver according to a third example embodiment will be described with reference to the drawings. The transmitter/receiver of the present example embodiment has a configuration in which the transmitter/receivers of the first and second example embodiments are simplified.

Figure 9:
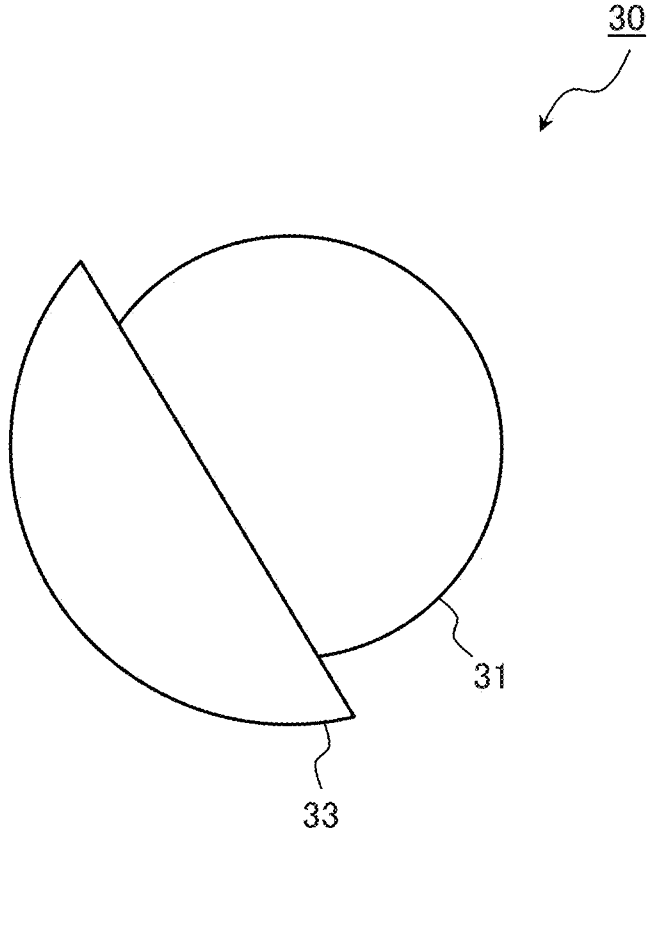
FIG. 9 is a conceptual diagram illustrating an example of a configuration of a transmitter/receiver according to a third example embodiment.
Figure 10:
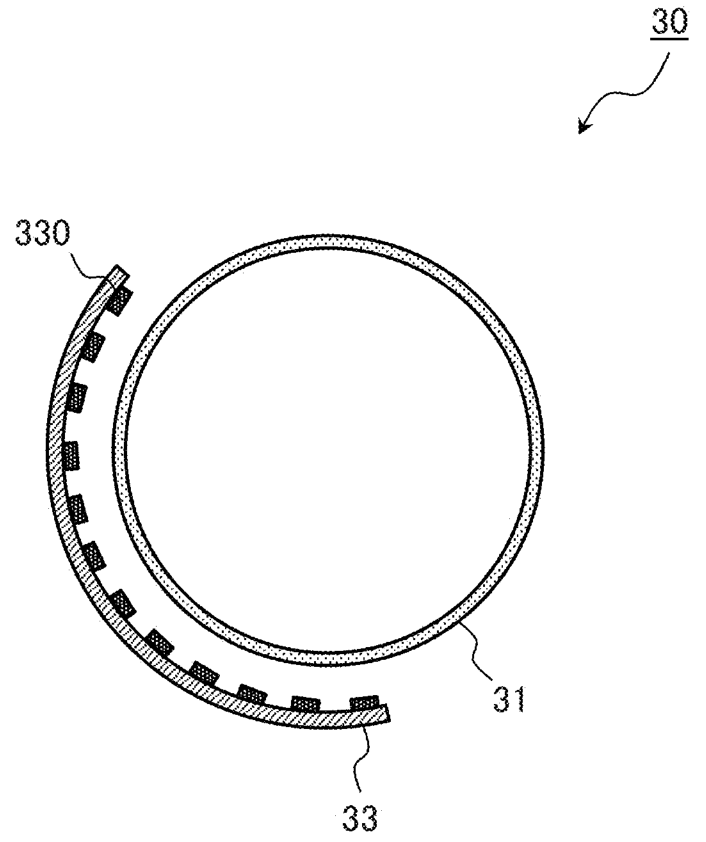
FIG. 10 is a cross-sectional view for describing a configuration example of a transmitter/receiver according to the third example embodiment.

FIG. 9 is a block diagram illustrating an example of a configuration of a transmitter/receiver 30 according to the present example embodiment. FIG. 10 is a cross-sectional view of the transmitter/receiver 30 of FIG. 9 taken along a plane parallel to the paper plane of FIG. 9. The transmitter/receiver 30 includes a spherical radio wave lens 31 and an array antenna 33.

The meta-surface that converges the desired radio wave which is a transmitting/receiving target is formed in the spherical radio wave lens 31. The array antenna 33 is arranged to face the spherical radio wave lens 31. In the array antenna 33, a plurality of antenna units 330 that transmit and receive the desired radio wave which is a transmitting/receiving target are arranged in accordance with the focal positions of the spherical radio wave lens 31.

The transmitter/receiver of the present example embodiment receives the desired radio wave converged by the spherical radio wave lens by a plurality of antenna units arranged in accordance with the focal positions of the spherical radio wave lens. The transmitter/receiver according to the present example embodiment can perform simultaneous transmission and reception of the desired radio waves with a plurality of communication targets by using a plurality of antenna units. The transmitter/receiver of the present example embodiment receives the desired radio wave by a plurality of antenna units arranged at the focal positions of the spherical radio wave lens. Therefore, since the transmitter/receiver of the present example embodiment has a larger reception area than the radio wave lens arranged on a plurality of antenna unit planes, the high gain can be obtained. That is, according to the transmitter/receiver of the present example embodiment, it is possible to perform simultaneous transmission and reception of the desired radio wave with a plurality of communication targets while achieving both the gain and the number of communications.

Application Example

Figure 11:
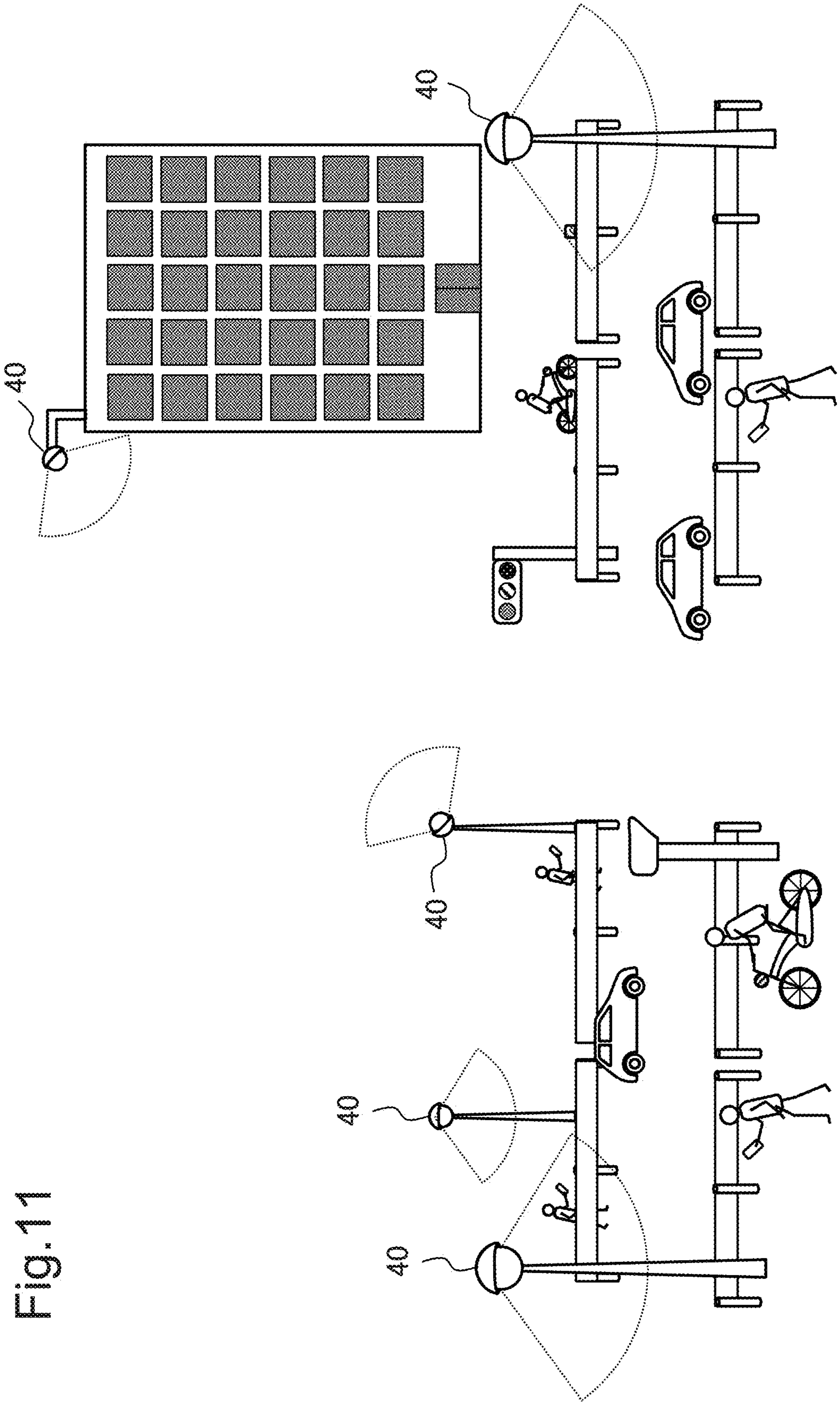
FIG. 11 is a conceptual diagram for describing an application example of the transmitter/receiver according to each example embodiment.
Figure 12:
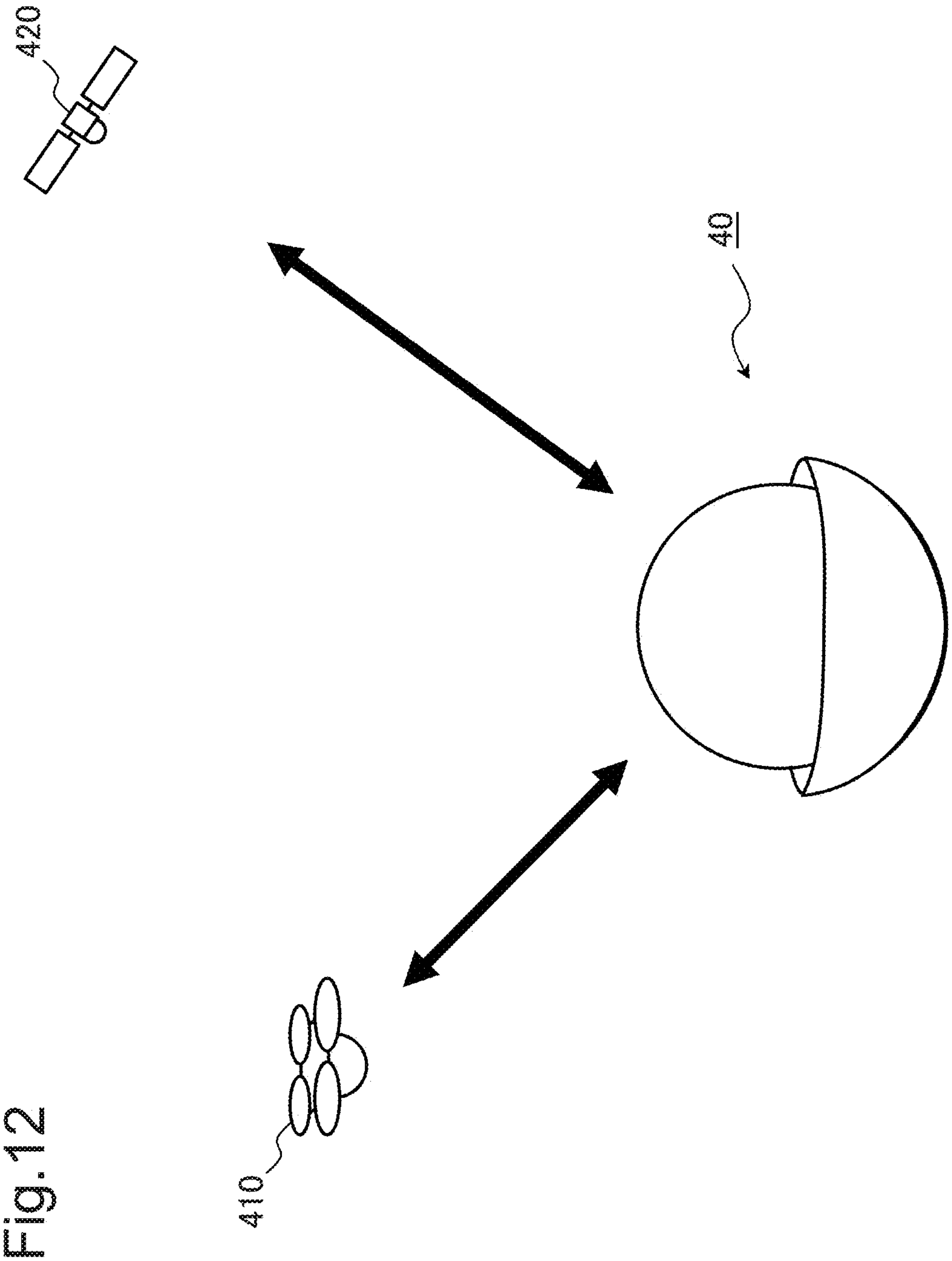
FIG. 12 is a conceptual diagram for describing an application example of the transmitter/receiver according to each example embodiment.

Next, an application example of the transmitter/receivers according to the first to third example embodiments will be described with reference to the drawings. FIGS. 11 to 12 are conceptual diagrams for describing an application example. In the following application example, an example using any one (a transmitter/receiver 40) of the transmitter/receivers according to the first to third example embodiments will be described. The transmitter/receiver 40 is connected to a transmitting/receiving circuit (not illustrated).

FIG. 11 illustrates an example in which the transmitter/receiver 40 used as a base station is arranged in a downtown area. For example, the transmitter/receiver 40 is installed beside a road where people or automobiles pass by. For example, the transmitter/receiver 40 is arranged on the rooftop of a building. Since the communication range of the transmitter/receiver 40 is wide, the range that can be covered by one transmitter/receiver is wide. The transmitter/receiver 40 can be applied to base stations of various forms. The transmitter/receiver 40 may be arranged not only outdoors but also indoors. For example, the transmitter/receiver 40 may be used as an access point or a router. The purpose of the transmitter/receiver 40 is not limited as long as it is used for wireless communication.

FIG. 12 illustrates an example in which the transmitter/receiver 40 is arranged with the spherical radio wave lens facing upward. The transmitter/receiver 40 wirelessly communicates with a drone 410 or an artificial satellite 420 flying in the sky. In the drone 410 or the artificial satellite 420, the transmitter/receiver 40 is arranged with the spherical radio wave lens facing downward. According to the application example of FIG. 12, a communication system capable of communicating with the entire celestial sphere can be constructed.

Hardware

Here, a hardware configuration of executing the control and process according to each example embodiment of the present disclosure will be described using an information processing device 90 of FIG. 13 as an example. The information processing device 90 in FIG. 13 is a configuration example for executing the control and process of each example embodiment, and is not intended to limit the scope of the present disclosure.

Figure 13:
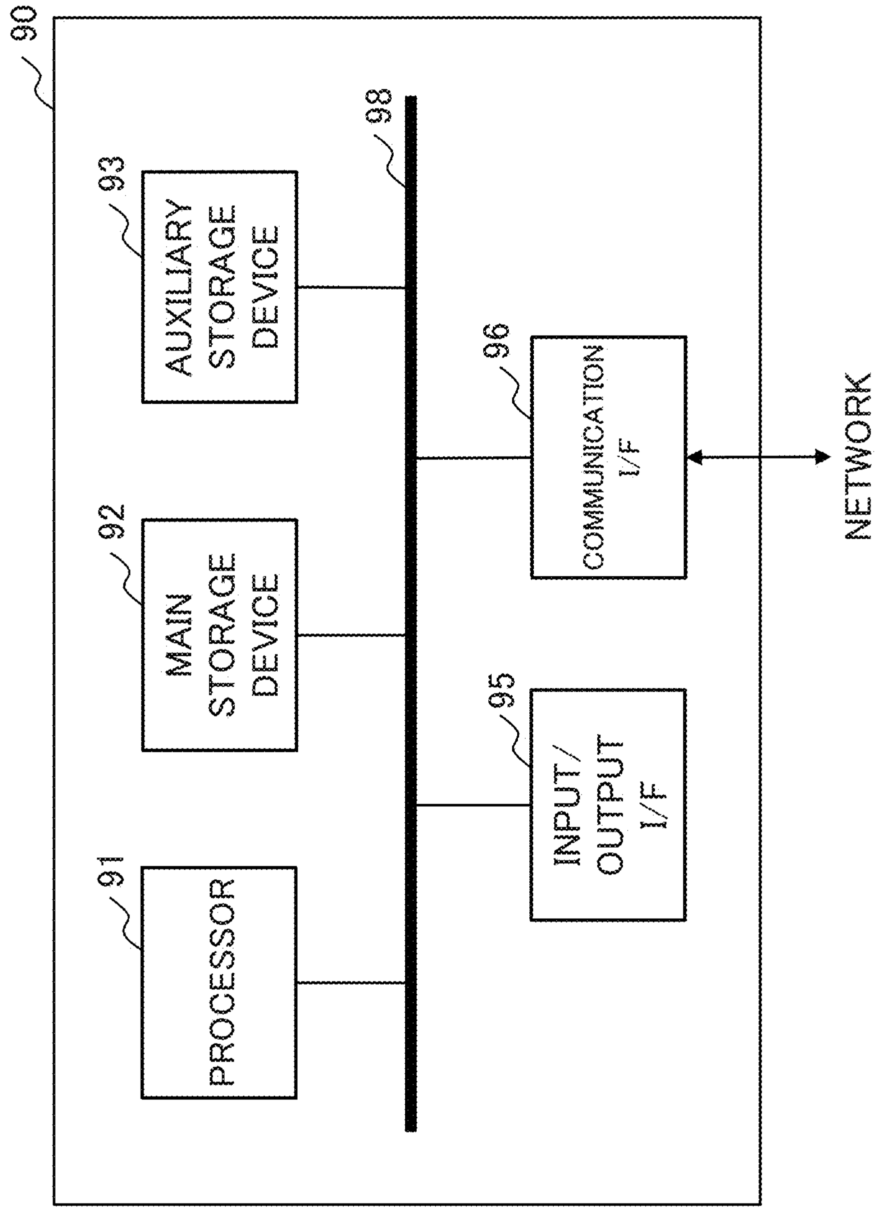
FIG. 13 is a block diagram illustrating an example of a hardware configuration that implements control and a process according to each example embodiment.

As illustrated in FIG. 13, the information processing device 90 includes a processor 91, a main storage device 92, an auxiliary storage device 93, an input/output interface 95, and a communication interface 96. In FIG. 13, the interface is abbreviated as an I/F. The processor 91, the main storage device 92, the auxiliary storage device 93, the input/output interface 95, and the communication interface 96 are connected to each other to be able to perform data communication via a bus 98. The processor 91, the main storage device 92, the auxiliary storage device 93, and the input/output interface 95 are connected to a network such as the Internet or an intranet via the communication interface 96.

The processor 91 develops a program stored in the auxiliary storage device 93 or the like onto the main storage device 92. The processor 91 executes the program developed onto the main storage device 92. In the present example embodiment, a configuration that uses a software program installed in the information processing device 90 is desirable. The processor 91 executes the control and process according to each example embodiment.

The main storage device 92 has an area in which a program is developed. The program stored in the auxiliary storage device 93 or the like is developed onto the main storage device 92 by the processor 91. The main storage device 92 is implemented by, for example, a volatile memory such as a dynamic random access memory (DRAM). A nonvolatile memory such as a magnetoresistive random access memory (MRAM) may be configured/added as the main storage device 92.

The auxiliary storage device 93 stores various data such as programs. The auxiliary storage device 93 is implemented by a local disk such as a hard disk or a flash memory. Various data may be stored in the main storage device 92, and the auxiliary storage device 93 may be omitted.

The input/output interface 95 is an interface for connecting the information processing device 90 and peripheral devices based on standards or specifications. The communication interface 96 is an interface for connecting to external systems or devices via a network such as the Internet or an intranet based on standards or specifications. The input/output interface 95 and the communication interface 96 may be shared as an interface connected to an external device.

Input devices such as a keyboard, a mouse, and a touch panel may be connected to the information processing device 90 as necessary. These input devices are used to input information or settings. In a case in which the touch panel is used as the input device, a display screen of a display device may also serve as the interface of the input device. Data communication between the processor 91 and the input device may be mediated by the input/output interface 95.

The information processing device 90 may be provided with a display device for displaying information. In a case in which a display device is provided, it is desirable that the information processing device 90 include a display control device (not illustrated) for controlling display of the display device. The display device may be connected to the information processing device 90 via the input/output interface 95.

The information processing device 90 may be provided with a drive device. The drive device mediates reading of data or a program from a recording medium, writing of a processing result of the information processing device 90 into a recording medium, and the like between the processor 91 and the recording medium (a program recording medium). The drive device may be connected to the information processing device 90 via the input/output interface 95.

The above example is the example of the hardware configuration for enabling the control and process according to each example embodiment of the present invention. The hardware configuration of FIG. 13 is the example of the hardware configuration for executing the control and process according to each example embodiment, and is not intended to limit the scope of the present invention. A program causing a computer to execute the control and process according to each example embodiment is also included in the scope of the present invention. A program recording medium in which the program according to each example embodiment is recorded is also included in the scope of the present invention. The recording medium can be implemented by, for example, an optical recording medium such as a compact disc (CD) or a digital versatile disc (DVD). The recording medium may be implemented by a semiconductor recording medium such as a universal serial bus (USB) memory or a secure digital (SD) card. The recording medium may be implemented by a magnetic recording medium such as a flexible disk, or recording media. In a case in which a program executed by the processor is recorded in a recording medium, the recording medium is equivalent to the program recording medium.

The components of each example embodiment may be specifically combined. The components of each example embodiment may be implemented by software or may be implemented by a circuit.

While the present invention has been described with reference to exemplary example embodiments thereof, the present invention is not limited to these example embodiments. It will be understood by those of ordinary skill in the art that various changes in form and details may be made therein without departing from the scope of the present invention as defined by the claims.

REFERENCE SIGNS LIST

1, 2 transmission/reception device
10, 20, 30, 40 transmitter/receiver
11, 21, 31 spherical radio wave lens
13, 23, 33 array antenna
17, 27 transmitting/receiving circuit
111, 211 meta-surface portion
113, 213 support
130, 230, 330 antenna unit

What is claimed is:

1. A transmitter/receiver comprising:

a spherical radio wave lens in which a meta-surface converging a desired radio wave which is a transmitting/receiving target is formed; and a plurality of array antennas that are arranged to face the spherical radio wave lens, and include antenna units that transmit and receive the desired radio wave which is the transmitting/receiving target and are arranged in accordance with focal positions of the spherical radio wave lens.

2. The transmitter/receiver according to claim 1, wherein the spherical radio wave lens includes a spherical support through which the desired radio wave passes, and a meta-surface portion including the meta-surface in which structures smaller than a wavelength of the desired radio wave are periodically arranged on a surface.

3. The transmitter/receiver according to claim 1, wherein the array antenna has a spherical shell shape in which a plurality of antenna units are arranged on a concave surface, and the concave surface is arranged to face the spherical radio wave lens.

4. The transmitter/receiver according to claim 3, wherein the plurality of antenna units are arranged in an arc form on the concave surface of the array antenna.

5. The transmitter/receiver according to claim 3, wherein the plurality of antenna units are arranged in a mesh form on the concave surface of the array antenna.

6. The transmitter/receiver according to claim 1, wherein the spherical radio wave lens is configured to converge the desired radio wave arriving from the same direction toward a single antenna unit.

7. The transmitter/receiver according to claim 1, wherein the spherical radio wave lens is configured to converge the desired radio wave arriving from the same direction toward at least two antenna units.

8. A transmission/reception device comprising:

the transmitter/receiver according to claim 1; and a transmitting/receiving circuit configured to acquire a reception signal associated with a radio wave received by the transmitter/receiver, decode and output the acquired reception signal, acquire a transmission signal directed toward a communication target, and output the acquired transmission signal to an antenna unit configured to transmit the acquired transmission signal toward the communication target.

9. The transmission/reception device according to claim 8, wherein the transmitting/receiving circuit is configured to perform transmission and reception of the desired radio wave with the same communication target in a time division manner by using the same antenna unit.

10. A transmission/reception method executed by a computer by using a transmitter/receiver including a spherical radio wave lens in which a meta-surface converging a desired radio wave which is a transmitting/receiving target is formed and an array antenna that is arranged to face the spherical radio wave lens, and includes antenna units that transmit and receive the desired radio wave which is the transmitting/receiving target and are arranged in accordance with focal positions of the spherical radio wave lens, the method comprising:

acquiring a reception signal associated with a radio wave received by the transmitter/receiver;

decoding and outputting the acquired reception signal;

acquiring a transmission signal directed toward a communication target; and outputting the acquired transmission signal to an antenna unit configured to transmit the acquired transmission signal toward the communication target.

* * * * *